United States Patent
Hedrington

(10) Patent No.: US 12,370,904 B2
(45) Date of Patent: Jul. 29, 2025

(54) METHODS AND SYSTEMS FOR GENERATING POWER FOR WORK MACHINE

(71) Applicant: Caterpillar Paving Products Inc., Brooklyn Park, MN (US)

(72) Inventor: Mathew J. Hedrington, Ham Lake, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 280 days.

(21) Appl. No.: 18/142,345

(22) Filed: May 2, 2023

(65) Prior Publication Data

US 2024/0367525 A1    Nov. 7, 2024

(51) Int. Cl.
*B60L 15/20* (2006.01)
*B60L 7/18* (2006.01)
*B60L 15/38* (2006.01)

(52) U.S. Cl.
CPC .......... *B60L 15/2009* (2013.01); *B60L 7/18* (2013.01); *B60L 15/38* (2013.01); *B60L 2200/28* (2013.01); *B60L 2200/40* (2013.01); *B60L 2240/423* (2013.01); *B60L 2240/642* (2013.01)

(58) Field of Classification Search
None
See application file for complete search history.

(56) References Cited

U.S. PATENT DOCUMENTS

| | | | |
|---|---|---|---|
| 4,319,856 A | 3/1982 | Jeppson | |
| 7,712,760 B2 | 5/2010 | Ohtomo | |
| 7,715,958 B2 | 5/2010 | Kumar | |
| 10,449,954 B2 * | 10/2019 | Layfield | B60L 15/2036 |
| 10,821,853 B2 * | 11/2020 | Healy | B60W 20/12 |
| 10,889,288 B2 * | 1/2021 | Richter | B60W 10/08 |
| 2011/0253463 A1 | 10/2011 | Smith | |
| 2022/0056649 A1 | 2/2022 | Olsen et al. | |
| 2023/0151561 A1 * | 5/2023 | Erdtmann | B60L 1/02 404/79 |

FOREIGN PATENT DOCUMENTS

| | | |
|---|---|---|
| DE | 102013104211 | 10/2014 |
| JP | 6420120 | 11/2018 |

* cited by examiner

*Primary Examiner* — Todd Melton

(57) ABSTRACT

A system includes a paver work machine, one or more tow machines, and a controller. The paver includes a motor-generator unit (MGU) selectively operable in a motor mode and a generator mode, and a power source electrically connected to the MGU and configured to supply electrical power to and receive electrical power from the MGU. Each of the one or more tow machines are configured to be connected to and pull the paver. The controller is communicatively connected to and configured to selectively operate the MGU in the generator mode to supply electrical power to and charge the power source or in the motor mode to use electrical power from the power source to power at least a portion of operation of the paver.

20 Claims, 3 Drawing Sheets

METHODS AND SYSTEMS FOR GENERATING POWER FOR WORK MACHINE

TECHNICAL FIELD

This disclosure relates generally, but not by way of limitation, to work machines for constructing, repairing, reconditioning, stabilizing, or taking-up road or like surfaces.

BACKGROUND

Paver work machines commonly include a paving vehicle with a reservoir of asphalt material and a screed which trails behind the paving vehicle to spread out, level, and at least partially compact the asphalt paving material. Pavers are commonly employed to lay new or repair/refurbish existing roadways.

Due to their function and output, pavers travel at relatively slow speeds on the order of 20 feet per minute. Additionally, pavers commonly work over a relatively long distance to construct or repair a roadway. In order to keep the machine operating on a roadway for long time periods and over long distances, pavers work in conjunction with material transfer machines, which deliver paving material to the paver.

The type of powerplant employed for terrestrial vehicles is currently undergoing a change in many applications, as such vehicles are transitioned from fossil fuel/internal combustion (IC) engine powerplants to an electric motor or hybrid IC engine and electric motor powerplants. In work machines like pavers, the powerplant of the machine is often employed to propel the machine and operate one or more implements of the machine.

As with electric automobiles, range can be a substantial challenge with work machines. Due to their operational characteristics (e.g. operating over relatively long distances for relatively long periods of time) and function (e.g. constructing a uniform/consistent road mat), an operating range of pavers with an electric or hybrid powerplant may be particularly challenging, especially in remote areas where charging infrastructure may not be available or practical to provide.

DE102013104211A1, entitled "ROAD FINISHER OR FEEDER, COMPACTOR, SYSTEM AND METHOD FOR OPERATING A ROAD CONSTRUCTION MACHINE" discloses a road finisher (30) or feeder, a compressor, a system and a method for operating electric road construction machines. An electrical operation or drive of a first road construction machine, such as a road roller, is provided. An electrical energy store (26) is used to supply the same. The energy store (26) is charged by a second road construction machine, in particular a road finisher (30), by means of a charging station (46).

SUMMARY

In an example, a system includes a paver work machine, one or more tow machines, and a controller. The paver includes a motor-generator unit (MGU) selectively operable in a motor mode and a generator mode, and a power source electrically connected to the MGU and configured to supply electrical power to and receive electrical power from the MGU. Each of the one or more tow machines are configured to be connected to, pull, and deliver paving materials to the paver. The controller is communicatively connected to and configured to selectively operate the MGU in the generator mode to supply electrical power to and charge the power source or in the motor mode to use electrical power from the power source to power at least a portion of operation of the paver.

In an example, a method of operating a motor-generator unit (MGU) of a paver work machine in a motor mode to use electrical power from a power source electrically connected to the MGU to power at least a portion of operation of the paver, coupling a tow machine to the paver to pull and deliver paving materials to the paver, operating the MGU of the paver in a generator mode to supply electrical power to and charge the power source, and vary a retarding capacity of a machine retarder system of the paver to vary an amount of regenerative power generated by the MGU in the generator mode.

In an example, a system includes a paver work machine and a controller. The paver includes a motor-generator unit (MGU) selectively operable in a motor mode and a generator mode and a power source electrically connected to the MGU and configured to supply electrical power to and receive electrical power from the MGU. The controller is communicatively connected to and configured to selectively operate the MGU in the generator mode to supply electrical power to and charge the power source or in the motor mode to use electrical power from the power source to power at least a portion of operation of the paver. The controller is configured to control the MGU to regeneratively brake in the generator mode and to vary a retarding effect of the MGU regenerative braking to vary an amount of regenerative power generated by the MGU in the generator mode.

These and other examples and features of the present devices, systems, and methods will be set forth in part in the following Detailed Description. This overview is intended to provide a summary of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
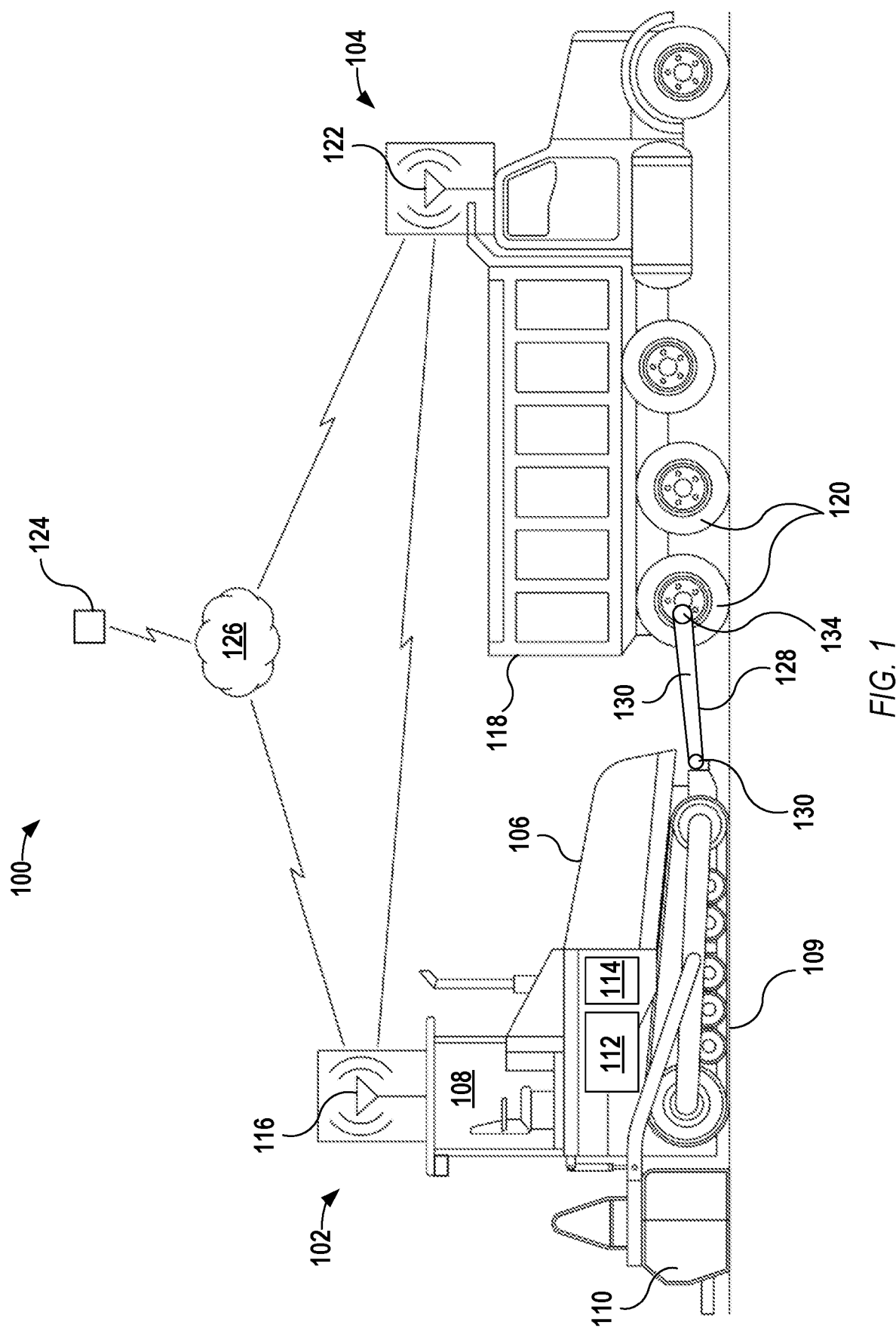
FIG. 1 is an elevation view schematically depicting an example system including a paver work machine and a material transfer machine.

FIG. 1 is an elevation view schematically depicting example system 100 including paver work machine 102 and material transfer machine 104, which in the example of FIG. 1 is a supply truck preparing to or in the process of supply the paver work machine with paving material. In accordance with embodiments of the present disclosure, other types of material transfer machines may be employed with and may supply paving material to a paver work machine. For example, in some cases, a paver may operate in conjunction with a cold planer, which mills an existing roadway and delivers the millings to the paver.

Paver 102 includes hopper 106 for receiving material from the material transfer machine 104, operator cab or position 108, tracks 109, and screed assembly 110 to which material from the hopper is conveyed for discharge onto a roadbed base. Example paver 102 also includes motor-generator unit (MGU) 112, battery 114, and transceiver 116. MGU 112 can be configured to selectively operate in a motor mode to use electrical power from battery 114 to power at least a portion of operation of the paver and a generator mode to supply electrical power to and charge the battery. Battery 114 can be a rechargeable battery electrically connected to MGU 112 and configured to supply electrical power to and receive electrical power from the MGU. In other examples, a paver or other work machine in accordance with examples of this disclosure can include a power source other than a rechargeable battery, e.g. a capacitor or other electrical energy storage mechanism/system.

Paver 102 can be an electrically powered vehicle, in which MGU 112 is operatively coupled to tracks 109 (or other road engaging members), e.g. through a drive train and configured to draw energy from battery 114 to propel paver 102 over the terrain of a job site. MGU 112, using energy drawn from battery 114 can also be configured to power various implements or other systems/aspects of operation of paver 102, including, e.g., screed 110. In other examples, however, paver 102 includes a hybrid powerplant, in which MGU 112 is combined with an internal combustion engine (ICE), the two of which can individually and/or together power aspects of operation of paver 102, including propelling the paver over the job site. In examples including a hybrid powerplant, the ICE could also be configured to charge battery 114.

Material transfer machine 104, which in the example of FIG. 1 is a supply/dump truck, includes implement 118, wheels 120, and transceiver 122. Implement 118 is an articulating open-box bed that can be actuated to, e.g., transfer paving materials from material transfer machine 104 to paver 102.

Example system 100 of FIG. 1 also includes controller 124, which can be included in or separate from either paver 102 and/or material transfer machine 104. In the example of FIG. 1, controller 124 is communicatively connected to paver 102 and material transfer machine 104 via network 126 and transceivers 116 and 122. However, in another example, controller 124 may be on board paver 102 or material transfer machine 104. For example, controller 124 can be part of or included in an electronic control unit ECU of paver 102. Additionally, examples according to this disclosure may include multiple controllers working in conjunction with each other to execute functions attributed to controller 124 in the example of FIG. 1.

Paver 102 may be required to operate over relatively long distances for relatively long periods of time. Additionally, paver 102 may be required to operate in remote areas where charging infrastructure may not be available or practical to provide. Due to these possible operational characteristics, the operating range of paver 102 and MGU 112 and battery 114 as part of an all-electric or hybrid powerplant may be particularly challenging.

In operation, pavers like example paver 102 periodically are supplied with paving material by a material transfer machine like material transfer machine 104 in the example of FIG. 1. In these coordinated operations between paver work machine 102 and material transfer machine 104 there is an opportunity to charge the electric power supply of the all-electric or hybrid paver 102, e.g., battery 114 by coupling paver 102 to material transfer machine 104 to allow the material transfer machine to pull the paver. Such regenerative charging of battery 114 (or other electrical power source) of paver 102 using material transfer machine 104 synergistically employs existing operational characteristics of paving to extend the operational range of all-electric or hybrid pavers, especially in remote areas where charging infrastructure may not be available or practical to provide.

Example paver 102 therefore includes example coupler 128, which is connected to a front region of paver 102 and configured to articulate and be releasably connected to a rear region of material transfer machine 104. In the example of FIG. 1, coupler 128 includes joint 130, link 132, and roller 134. Joint 130 can be rotatably coupled to the front region of paver 102. Link 132 can be, for example, a telescoping link that can be adjusted to allow for the proper spacing between the front region of paver 102 and the rear region of material transfer machine 104. And roller 134 can be configured to engage a lip on the rim of each of the rear wheels 120 of material transfer machine 104. Coupler 128 or another coupler/coupling mechanism can be configured to be actuated in various ways, e.g., manually by an operator or by motors or other drive system to couple paver 102 to material transfer machine 104. Additionally, other examples in accordance with this disclosure may employ a variety of different structures to mechanically couple a paver to a material transfer machine.

Once paver 102 and material transfer machine 104 are mechanically coupled by coupler 128, material transfer machine 104 can pull paver 102 to transform mechanical energy to electrical energy and thereby regeneratively charge battery 114 and/or power MGU 112 (and/or other systems of paver 102. In an example, controller 124 is communicatively connected to and configured to selectively operate MGU 112 in the generator mode to supply electrical power to and charge battery 114. And controller 124 working in conjunction with operational systems of paver 102, e.g., MGU 112, and/or sensors of paver 102, e.g., traction, grade, and/or speed sensors can be employed to improve regenerative charging and/or powering of battery 114 and/or MGU 112 of paver 102, as the machine is pulled by material transfer machine 104. Once paver 102 and material transfer machine 104 (or another material transfer machine) are decoupled, controller 124 can operate MGU 112 in the motor mode to use electrical power from battery 114 to power at least a portion of operation of the paver, including, e.g., to propel the paver.

Although the examples of FIG. 1 (and FIG. 2 described below) include material transfer machine 104 configured to pull and supply paving materials to paver 102, other examples in accordance with this disclosure can include other machines coupled to and pulling a paver to regeneratively charge a power source of the paver. For example, a different type of material transfer machine than the truck of the examples of FIG. 1 (and FIG. 2 described below) could be employed. Additionally, a compactor machine could be used in conjunction with a paver work machine and could be configured to be coupled to and pull the paver. In an example, a material supply or other machine may be coupled to an intermediary machine, which is coupled to a paver work machine.

Referring again to FIG. 1, controller 124 is communicatively connected to paver 102 and material transfer machine 104 via network 126 and transceivers 116 and 122. More generally, controller 124 or other controllers, ECUs, etc. included in examples according to this disclosure can be configured to communicate with one another and with other components of machines 102 and/or 104 via various wired or wireless communications technologies and components using various public and/or proprietary standards and/or protocols. Examples of transport mediums and protocols for electronic communication between components of machine 300 include Ethernet, Transmission Control Protocol/Internet Protocol (TCP/IP), IEEE 802.11 or Bluetooth, or other standard or proprietary transport mediums and communication protocols.

In some examples, controller 124 can be included in an ECU of paver 102 and/or material transfer machine 104. An electronic control unit (ECU) can be an embedded system that controls various aspects of machine operation. Types of ECUs include Electronic/Engine Control Module, Powertrain Control Module, Transmission Control Module, Brake Control Module, Suspension Control Module, among other examples. In the case of industrial, construction, and other heavy machinery, example ECUs can also include an Implement Control Module associated with one or more implements coupled to and operable from the machine.

Example machine 102 may include, for example, an Engine Control Module (ECM) associated with MGU 112, an Implement Control Module (ICM) associated with screed 110, a Transmission Control Module (TCM) associated with a transmission operatively coupled to MGU 112 and/or other powerplant of paver 102, and a Brake Control Module (BCM) associated with the braking system (or other machine retarding systems) of machine 102. These electronic modules/units can be communicatively connected and configured to send and receive data, sensor or other digital and/or analog signals, and other information between the various ECUs of machine 102. Additionally, functions attributed to an ECU or controller 124, can be distributed among multiple devices.

Controller 124, whether onboard or separate from paver 102 and/or material transfer machine 104, can include software, hardware, and combinations of hardware and software configured to execute a number of functions attributed to the components in the disclosed examples. Such controllers in examples according to this disclosure can be an analog, digital, or combination analog and digital controller including a number of components. As examples, the controller(s) can include integrated circuit boards or ICB(s), printed circuit boards PCB(s), processor(s), data storage devices, switches, relays, etcetera. Examples of processors can include any one or more of a microprocessor, a controller, a digital signal processor (DSP), an application specific integrated circuit (ASIC), a field-programmable gate array (FPGA), or equivalent discrete or integrated logic circuitry.

Controller(s), ECUs and other electronic controls in examples according to this disclosure can include storage media to store and/or retrieve data or other information, for example, signals from sensors. Examples of non-volatile storage devices include magnetic hard discs, optical discs, floppy discs, flash memories, or forms of electrically programmable memories (EPROM) or electrically erasable and programmable (EEPROM) memories. Examples of volatile storage devices include random access memories (RAM), dynamic random access memories (DRAM), static random access memories (SRAM), and other forms of volatile storage devices. The data storage devices can be used to store program instructions for execution by processor(s) of, for example, controller 124.

Figure 2:
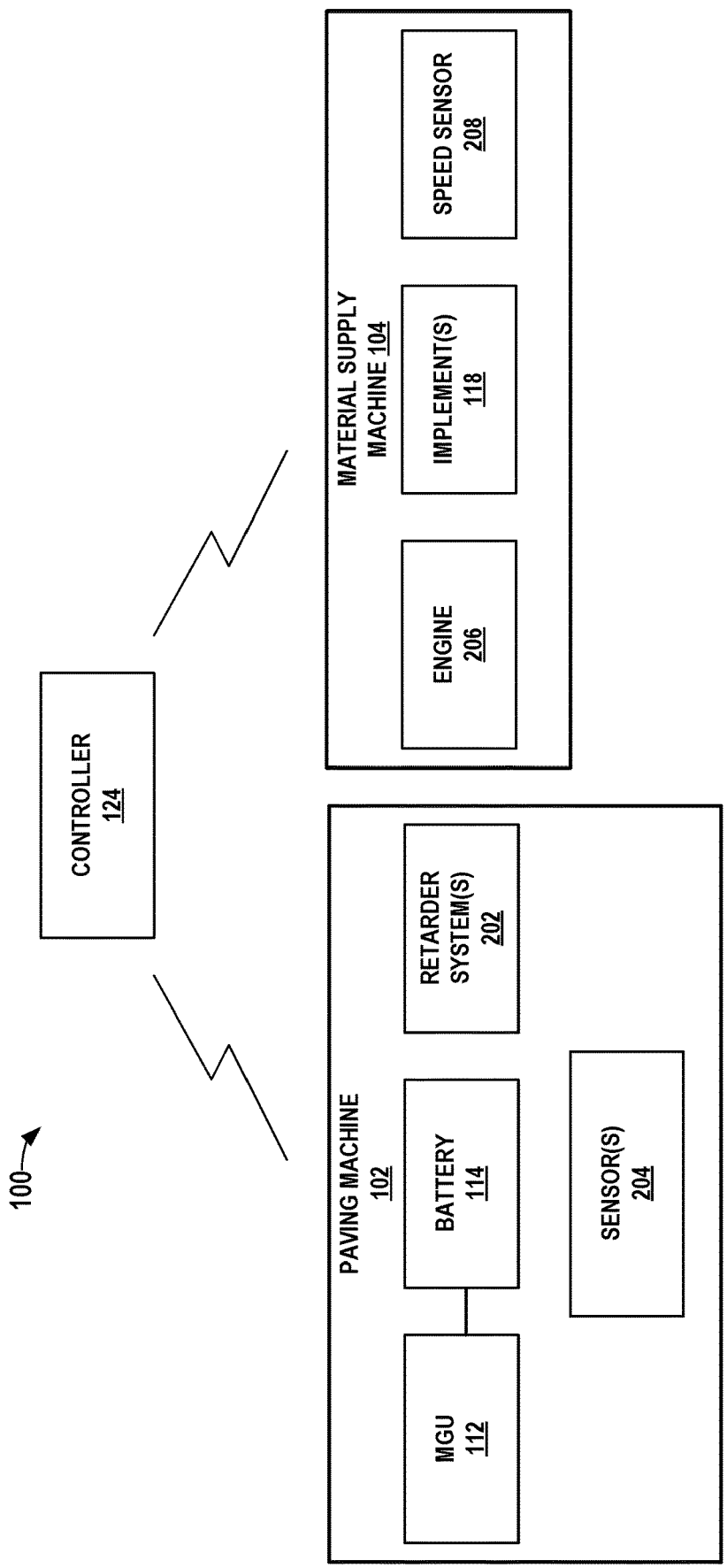
FIG. 2 is a block diagram schematically depicting the example system including the paver work machine and the material transfer machine of FIG. 1.

FIG. 2 is a block diagram schematically depicting example system 100 including paver 102 and material transfer machine 104. Paver 102 includes MGU 112, battery 114, and sensors 204. Material transfer machine 104 includes engine 206, implement(s) 118, and sensor(s) 208. Sensors 204 of paver 102 can include, e.g., a traction sensor, speed sensor, and/or grade sensor. Sensor(s) 208 of material transfer machine 104 can include, e.g., a traction sensor, speed sensor, and a tractive force sensor. Controller 124, as described above, is communicatively connected to and/or on-board paver 102 and/or material transfer machine 104, including components thereof, e.g. sensors 204, implement 118, and sensors 208.

MGU 112 can be configured to regeneratively brake, i.e. retard movement of paver 102. For example, in the regenerator mode of MGU 112, controller 124 can be configured to control MGU 112 to apply a force/torque to retard movement of paver 102, or, in other words, slow the rate of travel of the machine by retarding or counteracting kinetic energy of the machine, whether generated by, e.g., gravity or by the motor and/or engine of the machine, or, in examples according to this disclosure, counteracting the kinetic energy of the engine of material transfer machine 104.

In situations in which MGU 112 is controlled to regeneratively brake movement of paver 102, MGU 112 can have a maximum amount of braking referred to as retarding capacity and an amount of retarding braking produced by MGU 112 referred to as a retarding effect. Controller 124 can control MGU 112 to produce a constant or variable retarding effect. Additionally, maximum or other preset/predetermined retarding effects of MGU 112 can be stored in memory of controller 124 and/or in other components, and then be communicated to controller 124. As described in more detail below, in examples, controller 124 can vary the retarding effect of MGU 112 to vary an amount of regenerative power generated by MGU 112 in the generator mode.

A traction sensor can be but is not necessarily part of a traction control system of paver 102 and/or material transfer machine 104 and is configured to sense a loss of traction between tracks 109 (or other ground engagement members) of paver 102 and/or wheels 120 of material transfer machine 104 and the ground. Examples of traction sensors include speed sensors operatively coupled to tracks 109 of paver 102 and/or wheels 120 of material transfer machine 104 and configured to measure the spin rate of the tracks/wheels, which can be compared to the speed of paver 102 and/or material transfer machine 104 to detect slips/loss of traction.

The speed sensor can be a variety of types of sensors that are configured to measure the speed of paver 102 and/or material transfer machine 104 as it travels along and lays down an asphalt road mat. The grade sensor of paver 102 can include a number of different types of sensors, including, for example, accelerometer, inclinometer, tilt sensor, or another sensor for determining incline, decline, change in elevation, slope, orientation, or grade of paver 102. The grade sensor can also include a global positioning system, an external input regarding the grade of paver 102 at the current position of the machine, or an input from another source. For example, a three-dimensional model of the work site could be uploaded to paver 102 and could include slope and/or elevation data of the terrain over which the paver will travel/on which the paver will operate.

A tractive force sensor can be configured to generate signals indicative of a tractive force (and/or torque) generated by a work machine. The tractive force sensor of material transfer machine 104 can include a number of different types of sensors. For example, the tractive force sensor can be a torque sensor connected to a portion of the drive train of material transfer machine 104 and configured to measure an amount of torque generated by the machine while propelling the machine and pulling paver 102.

In examples, a tractive force sensor includes a load cell configured to measure tensile and/or compression forces. For example, one or more load cells could be connected to a coupler, e.g. to link 132 of coupler 128. As material transfer machine 104 pulls paver 102, the load cell(s) measures the tensile force exerted on link 132 of coupler 128 and sends signals indicative of such force to controller 124. Controller 124 can be configured to determine or estimate the tractive force of material transfer machine 104 based on the tensile force sensed by the load cell(s).

Once paver 102 and material transfer machine 104 are mechanically coupled by coupler 128, material transfer machine 104 can pull paver 102 to transform mechanical energy to electrical energy and thereby regeneratively charge battery 114 and/or power MGU 112 (and/or other systems of paver 102). In an example, controller 124 is communicatively connected to and configured to selectively operate MGU 112 in the generator mode to supply electrical power to and charge battery 114. And controller 124 working in conjunction with, e.g., MGU 112 and/or sensors 204 of paver 102 and sensors 208 of material transfer machine 104, e.g. can be employed to improve regenerative charging and/or powering of battery 114 and/or MGU 112 of paver 102, as the machine is pulled by material transfer machine 104.

For example, controller 124 can be configured to vary the retarding effect of MGU 112 to vary the amount of energy generated by MGU 112 in the generator mode. In an example, controller 124 is configured to vary the retarding effect of MGU 112 based on signals/measurements from a traction sensor, a speed sensor, a grade sensor, and/or a tractive force sensor. In an example in which MGU 112 is operating in the generator mode, controller 124 is configured to vary the retarding effect of MGU 112 regeneratively braking based on an amount of traction of paver 102 and/or material transfer machine 104 sensed by traction sensor(s).

In an example, controller 124 is configured to control regenerative braking by MGU 112 in the generator mode to decrease the retarding effect based on the amount of traction of paver 102 and/or material transfer machine 104 sensed by the traction sensor indicating a loss of traction of the paver and/or the material transfer machine. In an example, controller 124 is configured to control regenerative braking by MGU 112 in the generator mode to increase the retarding effect until the traction sensor senses paver 102 and/or material transfer machine 104 has lost traction and thereafter to incrementally decrease the retarding effect until the traction sensor no longer senses loss of traction. In operation of paver 102 to condition or produce a road mat loss of traction may be undesirable or unacceptable due to how it may affect the quality of the road mat. Such tuning of retarding effect of MGU 112 in the generator mode based on signals of a traction sensor could be employed, however, in a test or calibration operation of paver 102.

In examples including use of load cell(s) on the coupling mechanism between machines, the load cell(s) could also be employed to sense loss of traction of paver 102 and/or material transfer machine 104, in addition to or in lieu of a traction sensor on paver 102. For example, as material transfer machine 104 pulls paver 102, the load cell(s) can measure the tensile force exerted on coupler 128. Controller 124 controls regenerative braking by MGU 112 in the generator mode to increase the retarding effect of regenerative braking by the MGU. And controller 124 can monitor the tensile force measured by the load cell(s), as this force increases with the increase in retarding effect. Upon the load cell(s) sensing a decrease in tensile force after such progressive increase with retarding effect and without a reduction in retarding effect, controller 124 can determine that such signals indicate a loss of traction of paver 102 and/or material transfer machine 104.

Signals and other information from a grade sensor can complement the optimization of regenerative charging using MGU 112 and the traction sensor. For example, controller 124 can be configured to automatically decrease the retarding effect of MGU 112 on condition the grade sensor indicates paver 102 is moving into an inclined section of roadway. In an example, controller 124 is configured to automatically increase the retarding effect of MGU 112 on condition the grade sensor indicates paver 102 is moving into a declined section of roadway.

The speed at which paver 102 travels as the machine lays down a road mat may need to be kept at a constant target value to produce a satisfactory road mat finish. Once paver 102 and material transfer machine 104 are coupled, the two machines will necessarily travel at the same speed, which will ultimately be dictated and controlled by operation of material transfer machine 104. Speed sensors of paver 102 and/or material transfer machine 104 can be employed to monitor the speed of the machines.

In situations in which material transfer machine 104 is pulling paver 102 and MGU 112 is in the generator mode to, e.g. regeneratively charge battery 114, a tractive force sensor of material transfer machine 104 can monitor the force/torque applied by the material transfer machine. In examples, controller 124 can control the tractive force generated by material transfer machine 104 and the retarding effect of MGU 112 regeneratively braking to improve regenerative charging by MGU 112 and operation of system 100.

For example, controller 124 can control the difference between the tractive force generated by material transfer machine 104 and the retarding effect of MGU 112 to cause the coupled paver 102 and material transfer machine 104 to travel at a constant speed. In an example, controller 124 controls the difference between the tractive force generated by material transfer machine 104 and the retarding effect of MGU 112 to cause the coupled paver 102 and material transfer machine 104 to travel at a constant predetermined speed that is determined as a function of the roadway construction, repair, reconditioning, or stabilizing for which the paver is being operated.

INDUSTRIAL APPLICABILITY

Figure 3:
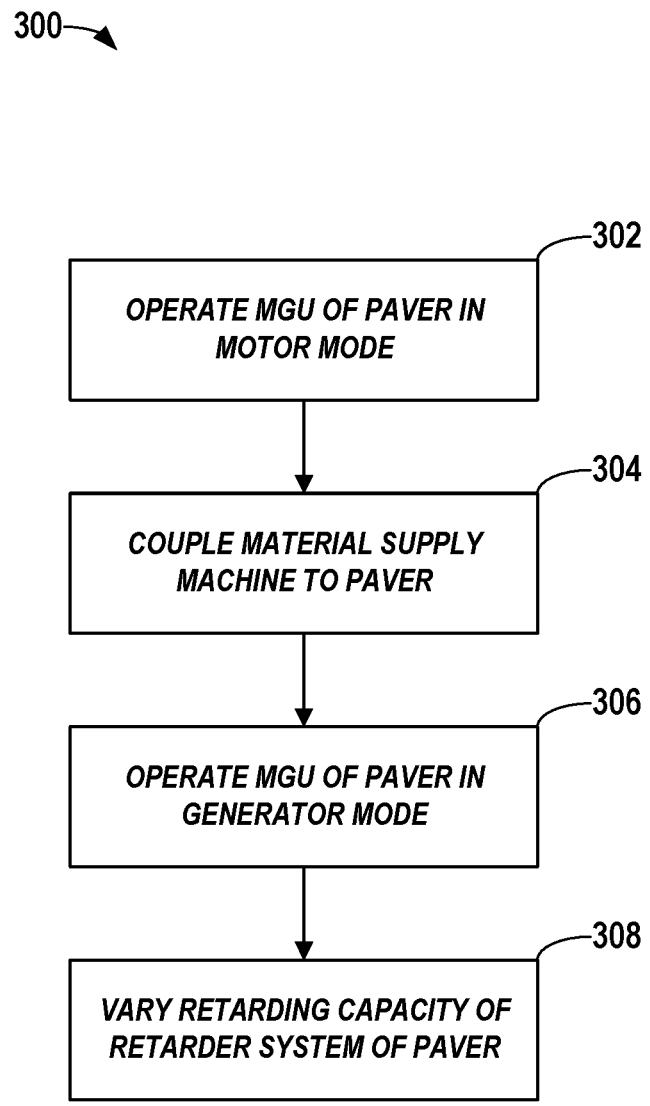
FIG. 3 is a flowchart depicting a method of conditioning a roadway with a paver machine.

FIG. 3 is a flowchart depicting a method of conditioning a roadway with a paver machine. Method 300 includes operating an MGU of a paver work machine in a motor mode to use electrical power from the battery to power at least a portion of operation of the paver (302), coupling a material transfer machine to the paver to pull and deliver paving materials to the paver (304), operating the MGU of the paver in a generator mode to supply electrical power to and charge the battery (306) while the paver is being pulled, and vary a retarding effect of the MGU regenerative braking to vary an amount of regenerative power generated by the MGU in the generator mode (308).

In an example, paver 102 is conditioning a roadway, e.g. by laying down a new asphalt road mat using screed 110. Paver 102, whether configured as an all-electric or hybrid power plant machine, is operating for a time with MGU 112 in a motor mode in which the MGU uses electrical power from battery 114 to power at least a portion of operation of the paver, including, e.g., to propel the paver and/or to operate screed 110. In some situations, paver 102 may operate in areas where charging infrastructure may not be available or practical to provide, and the range of MGU 112 using battery 114 in the motor mode is inherently limited. Additionally, as paver 102 lays down a new road mat the paving materials in hopper 106 become depleted and require replenishing.

After a period of time, therefore, material transfer machine 104 will arrive with additional paving materials for paver 102 and can synergistically be used to recharge battery 114 and/or power MGU 112. After material transfer machine 104 arrives to the location of paver 102, the material transfer machine can be coupled to the paver, e.g., using coupler 128, at which time the material transfer machine can begin to pull the paver. As material transfer machine 104 pulls and delivers paving materials to paver 102, controller 124 can operate MGU 112 in the generator mode to supply electrical power to and charge battery 114.

As material transfer machine 104 pulls paver 102, controller 124 varies the retarding effect of MGU 112 regenerative braking to vary the amount of energy generated by MGU 112 in the generator mode. Generally, controller 124 increases the retarding effect of the regenerative braking of MGU 112 to increase the amount of energy generated by MGU 112 and decreases the retarding effect of the regenerative braking of MGU 112 to decrease the amount of energy generated by MGU 112.

To establish a maximum regenerative energy generation for a given section of roadway, controller 124 is configured to determine a difference between a tractive force generated by material transfer machine 104 and measured by a tractive sensor thereof and a retarding effect of MGU 112 regenerative braking to cause the material transfer machine and the paver to travel at an approximately constant predetermined speed (e.g., in some examples, +/−5%, and, in other examples, +/−2% constant speed). The predetermined speed can be, e.g., a function of the roadway construction, repair, reconditioning, or stabilizing for which paver 102 is being operated.

At this target tractive force of material transfer machine 104, retarding effect of MGU 112 regenerative braking, and associated regenerative power generation, a grade sensor of paver 102 may detect the paver is beginning to become inclined as a result of traveling over an incline in the roadway. Then, controller 124, in communication with the grade sensor, can automatically decrease the retarding effect of MGU 112 in the inclined section of roadway, and, upon the grade sensor indicating the roadway has leveled out, can increase the retarding effect back to the previously established target value.

In the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific examples. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific examples. However, the benefits, advantages, solutions to problems, and any feature(s) that may cause any benefit, advantage, or solution to occur or become more pronounced are not to be construed as a critical, required, or essential feature of any or all the claims. Moreover, the particular examples disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular examples disclosed above may be altered or modified and all such variations are considered within the scope of the disclosed subject matter. Accordingly, the protection sought herein is as set forth in the claims below.

What is claimed is:

1. A system comprising:
   a paver work machine comprising:
      a motor-generator unit (MGU) selectively operable in a motor mode and a generator mode; and
      a power source electrically connected to the MGU and configured to supply electrical power to and receive electrical power from the MGU;
   one or more tow machines, each of which is configured to be connected to and pull the paver; and
   a controller communicatively connected to and configured to selectively operate the MGU in the generator mode to supply electrical power to and charge the power source or in the motor mode to use electrical power from the power source to power at least a portion of operation of the paver.

2. The system of claim 1, wherein the controller is configured to operate the MGU in the generator mode on condition a tow machine is connected to and pulling the paver vehicle.

3. The system of claim 1, wherein the controller is configured to operate the MGU in the motor mode on condition a tow machine is not connected to the paver vehicle.

4. The system of claim 1, wherein:
   the MGU is configured to retard movement of the paver using regenerative braking; and
   the controller is configured to control the MGU in the generator mode to vary a retarding effect of the MGU regenerative braking to vary an amount of regenerative power generated by the MGU in the generator mode.

5. The system of claim 4, further comprising:
   one or more traction sensors communicatively connected to the controller and configured to sense an amount of traction of one or both of the paver and a tow machine of the one or more tow machines, wherein the controller is configured to control the MGU in the generator mode to produce a retarding effect of the MGU regenerative braking based on the amount of traction of one or both of the paver and the tow machine of the one or more tow machines sensed by the one or more traction sensors.

6. The system of claim 5, wherein the controller is configured to control the MGU in the generator mode to increase the retarding effect of the MGU regenerative braking based on the amount of traction of the paver sensed by the traction sensor indicating no loss of traction of the paver or the tow machine of the one or more tow machines.

7. The system of claim 4, further comprising:
a tractive force sensor communicatively connected to the controller and configured to generate signals indicative of a tractive force generated by a tow machine of the one or more tow machines,
wherein the controller is configured to control the MGU in the generator mode to vary a retarding effect of the MGU regenerative braking based on the tractive force generated by the tow machine of the one or more tow machines and indicated by the tractive force sensor.

8. The system of claim 7, wherein the controller is configured to control the tractive force generated by the tow machine of the one or more tow machines and the retarding effect of the MGU regenerative braking to cause the paver and the tow machine of the one or more tow machines to travel at an approximately constant speed.

9. The system of claim 4, further comprising:
a grade sensor configured to measure an angle at which the paver is oriented,
wherein the controller is configured to automatically decrease the retarding effect of the MGU regenerative braking on condition the grade sensor indicates the paver is inclined.

10. The system of claim 4, wherein the controller is configured to automatically increase the retarding effect of the MGU regenerative braking on condition the grade sensor indicates the paver is declined.

11. The system of claim 1, wherein the MGU operates in the motor mode to use electrical power from the power source to propel the paver.

12. The system of claim 1, wherein a tow machine of the one or more tow machines comprises a material transfer machine.

13. A method comprising:
operating a motor-generator unit (MGU) of a paver work machine in a motor mode to use electrical power from a power source electrically connected to the MGU to power at least a portion of operation of the paver;
coupling a tow machine to the paver to pull the paver;
operating the MGU of the paver in a generator mode to supply electrical power to and charge the power source;
controlling the MGU to retard movement of the paver using regenerative braking; and
varying a retarding effect of the MGU regenerative braking to vary an amount of regenerative power generated by the MGU in the generator mode.

14. The method of claim 13, further comprising:
sensing an amount of traction of one or both of the paver and the tow machine using one or more traction sensors; and
varying the retarding effect of the MGU regenerative braking based on the amount of traction of one or both of the paver and the tow machine sensed by one or more traction sensors.

15. The method of claim 14, further comprising:
increasing the retarding effect of the MGU regenerative braking based on the amount of traction of one or both of the paver and the tow machine sensed by one or more traction sensors indicating no loss of traction of either machine.

16. The method of claim 13,
determining a tractive force generated by the tow machine using a tractive force sensor,
controlling the MGU in the generator mode to vary a retarding effect of the MGU regenerative braking based on the tractive force generated by the tow machine and determined by the tractive force sensor.

17. The method of claim 16,
control the tractive force generated by the tow machine and the retarding effect of the MGU regenerative braking to cause the paver and the tow machine to travel at an approximately constant speed.

18. The method of claim 13, further comprising:
detecting the paver is inclined using a grade sensor; and
decreasing the retarding effect of the MGU regenerative braking based on the grade sensor indicating the paver is inclined.

19. The method of claim 13, further comprising:
detecting the paver is declined using a grade sensor; and
increasing the retarding effect of the MGU regenerative braking based on the grade sensor indicating the paver is declined.

20. A system comprising:
a paver work machine comprising:
  a motor-generator unit (MGU) selectively operable in a motor mode and a generator mode; and
  a power source electrically connected to the MGU and configured to supply electrical power to and receive electrical power from the MGU; and
a controller communicatively connected to and configured to selectively operate the MGU in the generator mode to supply electrical power to and charge the power source or in the motor mode to use electrical power from the power source to power at least a portion of operation of the paver,
wherein the controller is configured to control the MGU to regeneratively brake in the generator mode and to vary a retarding effect of the MGU regenerative braking to vary an amount of regenerative power generated by the MGU in the generator mode.

* * * * *